United States Patent [19]
Schlesch

[11] 3,892,256
[45] July 1, 1975

[54] INVERTED BUCKET STEAM TRAP

[75] Inventor: Ronald D. Schlesch, Three Rivers, Mich.

[73] Assignee: Armstrong Machine Works, Three Rivers, Mich.

[22] Filed: Nov. 27, 1973

[21] Appl. No.: 419,438

[52] U.S. Cl. .............................................. 137/185
[51] Int. Cl. ............................................... F16t 1/30
[58] Field of Search ............ 137/185, 192; 251/366, 251/367

[56] References Cited
UNITED STATES PATENTS

| | | | |
|---|---|---|---|
| 2,053,641 | 9/1936 | Spade | 137/185 |
| 2,250,130 | 7/1941 | May | 137/192 X |
| 2,760,596 | 8/1956 | Kellie | 137/192 X |
| 2,896,905 | 7/1959 | Sthlin | 251/366 |

FOREIGN PATENTS OR APPLICATIONS

| | | | |
|---|---|---|---|
| 122,713 | 11/1946 | Australia | 137/185 |

*Primary Examiner*—Alan Cohan
*Attorney, Agent, or Firm*—Woodhams, Blanchard and Flynn

[57] ABSTRACT

An inverted bucket-type steam trap having a completely sealed casing of uniform wall thickness and preferably made of stainless steel. The casing is comprised of an upper part and a lower part. The lower part and the upper part both have a cylindrical wall portion which is open at one end and closed at the other end by a spherical segment-shaped bottom wall. The upper part and the lower part are affixed to each other by welding. The upper and lower parts have outlet and inlet fittings respectively welded thereto. A valve is provided in association with the outlet fitting. An inverted bucket is movable vertically inside the casing in response to the presence of condensate therein to operate the valve between opened and closed positions.

8 Claims, 2 Drawing Figures

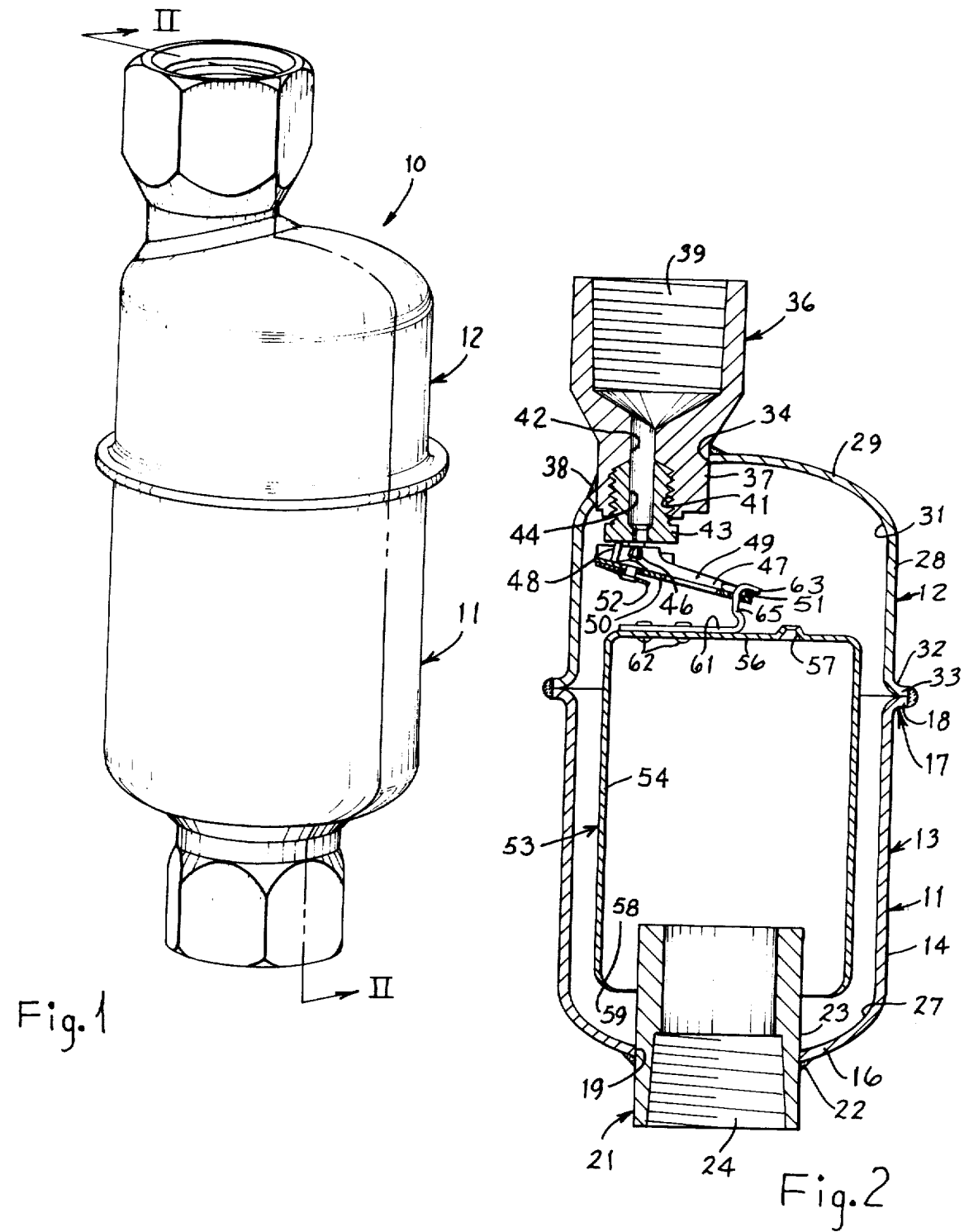

INVERTED BUCKET STEAM TRAP

BACKGROUND OF THE INVENTION

This invention relates to an improved inverted bucket-type steam trap and, more particularly, relates to an inverted bucket-type steam trap made of stainless steel and having a sealed tamper-proof construction.

DESCRIPTION OF THE PRIOR ART

It is well known to use steam traps in order to trap or retain steam in a device or system, while permitting condensate to be removed. One specific type of steam trap is the inverted bucket-type steam trap which has been extensively utilized for controlling the flow of condensate from a steam heated unit to a condensate return line. Such traps are generally utilized to permit disposal of the condensate while at the same time minimizing loss of live steam from the steam heated unit.

Further, known inverted bucket-type steam traps are rather large and heavy and they are subject to corrosion. It is desired to reduce the size and weight thereof and to increase the corrosion resistance thereof, while retaining the known advantages of the inverted bucket operating principle. However, efforts to reduce the weight of these traps also reduced the strength thereof so that they could not withstand high steam pressures. The use of exotic metals which provide the required strength, with low weight, is prohibitively expensive.

Accordingly, it is an object of this invention to provide an improved inverted bucket-type steam trap of smaller size and lighter weight than prior art steam traps of equivalent condensate handling capacity.

A further object of the invention is to provide an improved inverted bucket steam trap made primarily of stainless steel sheet so that it can be fabricated by relatively simple and inexpensive drawing operations and so that it will possess improved corrosion resistance and sufficient strength for handling high pressure, high temperature steam.

It is a further object of this invention to provide a sealed stainless steel inverted bucket-type steam trap which is tamper-proof.

Other objects and purposes of this invention will become apparent to persons acquainted with steam traps of this general type upon reading the following specification and inspecting the accompanying drawing, in which:

FIG. 1 is a perspective view of the steam trap embodying the invention; and

FIG. 2 is a central longitudinal sectional view of the steam trap taken along the line II—II in FIG. 1.

SUMMARY OF THE INVENTION

In general, the objects and purposes of the invention are met by providing, in an inverted bucket-type steam trap, a first stainless steel cylindrical cuplike body member having an open top and a spherical segment-shaped bottom wall. The spherical segment-shaped bottom wall has a central opening therein at the vertex thereof and a stainless steel inlet fitting extends through the opening and is welded to the bottom wall. The inlet fitting has a portion extending a short distance into the interior of the body member and coaxial therewith. A second stainless steel cylindrical inverted cuplike body member is provided and it has an open bottom and a spherical segment-shaped top wall. The opposing open ends of the first and second body members are secured together to define a sealed water-tight hollow casing. The spherical segment-shaped top wall of the casing has an opening therein at a location laterally offset from the vertex of the spherical segment. A stainless steel outlet fitting extends through the opening and is welded to the top wall. A valve seat is provided on the inner end of said outlet fitting. A valve member is movably mounted on the outlet fitting for movement toward and away from the valve seat. An operating lever assembly is coupled to the valve member and is responsive to vertically applied forces to effect movement of the valve member between opened and closed positions. An inverted, vertically movable, bucket having a cylindrical vertical wall, a top wall and an open bottom wall is vertically movably disposed inside the casing. The extension portion on the inlet fitting extends into the interior of the inverted bucket when the inverted bucket is in its lowermost position and the valve member is in the open position. The inverted bucket has a small vent opening in the top wall thereof. The top wall of the bucket also has a connector which is coupled to the operating lever assembly so that vertical movement of the inverted bucket in the casing will effect corresponding vertical movement of the operating lever assembly and an opening and closing of the valve member in response thereto.

DESCRIPTION OF A PREFERRED EMBODIMENT

The steam trap 10 illustrated in the drawing has an exterior casing comprised of a lower casing section 11 and an upper casing section 12, both made of sheet stock of substantially uniform thickness. The lower casing section 11 is comprised of a body 13 having a cylindrical wall 14 which is open at its upper end and which is closed at its lower end by a spherical segment-shaped bottom wall 16. The center point of the radius of curvature of the spherical segment-shaped bottom wall 16 lies on the longitudinal axis of the body 13. The upper edge portion of the wall 14 is flared at 17 radially outwardly to define a radial flange 18.

A circular opening 19 is provided in the spherical segment-shaped wall 16 at the vertex point of the spherical segment. The vertex point is the center point for the circular opening 19. A stainless steel inlet fitting 21 extends through the opening 19 and is secured to the wall 16, such as by a stainless steel weld 22. The inlet fitting has a tubular extension 23 extending vertically upwardly from the bottom wall for a short distance into the lower casing section 11. The periphery of the extension 23 is preferably circular to conform to the circular opening 19 in the bottom wall of the lower casing sections 11. The fitting has internal threads 24 so that it can be connected to a line carrying steam and condensate.

The shaping of the lower casing section 11 is accomplished by drawing a flat sheet to form the wall 14 into the cylindrical shape illustrated. The wall thickness is substantially uniform throughout the entire extent of casing section 11 and said casing section is free of any sharp corners or crevices in which dirt and other types of contaminants could collect. For example, the radius at 27 between the cylindrical wall 14 and the spherical segment-shaped wall 16 is sufficiently great to prevent the collection of dirt and the like thereat.

The upper casing section 12 is also made from a sheet having a substantially uniform wall thickness throughout. This is achieved by drawing a sheet to form a cylindrical wall 28 which is open at its bottom and which is closed at its top by a spherical segment-shaped top wall 29. The center point of the radius of the spherical segment lies on the longitudinal axis of the upper casing section 12. The cylindrical wall 28 and the spherical segment-shaped top wall 29 are joined by a smoothly curved radius portion 31. The accumulation of dirt and other contaminants in the upper casing section is essentially eliminated. The lower edge portion of the wall 28 is flared at 32 radially outwardly to define a flange 33 having a peripheral diameter generally equal to the peripheral diameter of the radially extending flange 18 on the lower casing section 11.

A circular opening 34 is provided in the spherical segment-shaped top wall 29. The center point of the circular opening 34 is offset from the vertex of the spherical segment for the top wall 29. An outlet fitting 36 has a circular lower portion 37 of reduced size thereon extending through the circular opening 34. The outlet fitting 36 has an internal pipe thread 39 in the upper enlarged portion thereof so that a condensate header line can be connected thereto. The outlet fitting 36 is secured as by a stainless steel weld 38 to the top wall 29. A threaded recess 41 is provided in the lower end of the outlet coupling 36 and opens into the interior of the upper casing section 12. A passageway 42 extends between the internal pipe thread portion 39 and the threaded recessed portion 41. A hollow externally threaded plug 43 is threadedly received into the threaded recess 41. The plug 43 has a passageway 44 through the central portion thereof communicating between the interior of the upper casing section 12 and the passageway 42. The lower edge of the passageway 44 defines a valve seat.

A valve member 46 is secured to an operating lever assembly 47. The operating lever assembly 47 is pivotally mounted on a pair of L-shaped pins 48 to the plug 43 inside the upper body part 12 so that said assembly is capable of pivoting about a horizontal axis. In this particular embodiment, the operating lever assembly 47 is a one-piece element having a base wall 50, upstanding side flanges 49 and a cross piece 51 at the free end thereof. The valve member 46 is secured to the base wall 50 by a keeper 52. A pivotal movement of the lever arm assembly 47 about the horizontal pivot defined by pins 48 will move the valve member 46 into and out of sealing relationship with the valve seat defined by the lower edge of the passageway 44 in the plug 43.

An inverted bucket 53 is disposed inside the casing. Preferably the bucket is shaped by drawing a sheet of substantially uniform thickness so as to form a cylindrical wall 54, which is open at its bottom and closed at its top by a top wall 56. In this particular embodiment, the top wall 56 is flat. A small opening 57 is provided in the top wall 56 offset from the center thereof to permit escape of gas from the upper end of the bucket at a slow controlled rate in a known manner. The diameter of the bottom of the bucket 53 is larger than the diameter of the extension 23 on the inlet coupling 21. The bottom edge of the inverted bucket is flared radially inwardly at 58 to define a lip 59. The radius of the flare 58 is quite large to minimize collection of dirt and the like thereat. Similarly, the radius between the cylindrical wall 54 and the top wall 56 will also prevent the formation or collection of dirt thereat.

A connector 61 is secured, as by a pair of rivets 62, to the upper surface of the top wall 56. The connector 61 has an upwardly extending extension portion 65 close to the common central axis of both the upper and lower casing sections, 12 and 11, respectively, and is bent to define a hook 63 at the upper end thereof. The hook 63 extends through a slot in base wall 50 and engages the cross piece 51 of the lever assembly 47.

The inverted bucket 53 has a sufficient weight to pull the operating lever assembly 47 downwardly and, consequently, pull the valve member 46 away from the lower end of the passageway 44 in the plug 53 when an insufficient amount of steam has been collected inside the inverted bucket and it is required that condensate be removed from the trap 10. However, when a sufficient quantity of steam collects in the upper end of the bucket 53 to impart buoyance thereto, the bucket will rise and will close the valve member 46 against the seat. In assembly, after the inverted bucket has been secured by the fastening member 61 to the operating lever assembly 47, the upper casing section 12 can be lowered onto the lower casing section 11 so that the flanges 33 and 18 abut at a common parting line 64. The upper and lower casing sections are secured together as by a stainless steel weld to thereby form a completely sealed and tamper-proof steam trap.

OPERATION

Although the operation of inverted bucket-type steam traps is well known, an abbreviated discussion thereof will be described below for convenience.

The steam trap 10 is normally installed in a drain line between the steam heated unit connected to the inlet coupling 21 and the condensate return header connected to the outlet coupling 36. When the inverted bucket 53 is in the lowermost position, as shown, the operating lever assembly 47 is in the lower position and the valve member 46 is wide open. The initial flood of condensate enters the steam trap 10 and flows beneath the lip 59 of the inverted bucket 53 to fill the trap body and completely submerge the inverted bucket. Excess condensate is discharged through the wide open valve member 46 to the outlet coupling 36. When steam enters the steam trap 10, it collects at the top portion of the inverted bucket 53 imparting buoyancy thereto. The inverted bucket will then rise and lift the valve member 46 toward its seat at the lower end of the passageway 44. When the valve member is close to the seat, but is still spaced therefrom a small distance, the further flow of condensate through the outlet opening 44 will effect a snapping of the valve member 46 into the closed position.

When the valve member 46 is closed, any air and carbon dioxide gas entering the trap will pass through the vent opening in the top wall 56 of the inverted bucket 53 and collect at the top of the steam trap in the upper body part 12. Similarly steam which reaches the upper end of the bucket will flow through the vent 57 at a slow controlled rate. This steam is eventually condensed by radiation from the steam trap. As condensate flows into the trap through the fitting 21, when the condensate level in the steam trap reaches a level which is slightly above the floating level for the inverted bucket 53, the inverted bucket will exert a slight pull downwardly on the operating lever assembly 47. However, the valve member 46 will not be moved to the open position until the condensate level rises to a predefined opening line in the unit for the existing pressure differential between the steam and the pressure in the outlet coupling 36 or condensate return header. When the condensate reaches this level, the weight of the inverted bucket multiplied by the leverage achieved by the length of the operating lever arm assembly 47 exceeds the pressure holding the valve 46 into its sealing engagement with the passageway 44. The inverted bucket 53 will then sink and open the valve member 46. Any accumulated air in the upper body part 12 is first discharged, followed by condensate.

The smoothly curved surfaces of the trap are flushed clean by the condensate passing through the system. That is, condensate entering the steam trap 10 through the inlet coupling 21 will travel into the interior of the inverted bucket 53 and out through the open bottom wall thereof past the flare 58 and lip 59. Any dirt accumulated on the lip 59 will be flushed into the lower casing section 11. Similarly, the radius 27 provided between the spherical segment-shaped bottom wall 16 and the cylindrical wall 14 will minimize the collection of dirt and the like thereat because the flow of condensate will move these contaminants up into the upper part of the steam trap 10 and eventually out through the outlet coupling 36. Likewise the rush of accumulated gas and condensate, when the valve opens, will wipe clean the surfaces of portion 37 and plug 43.

The thin wall construction of the upper and lower casing sections, in combination with the spherical segment-shaped upper and lower end walls provides a relatively small size and lightweight construction, which is capable of withstanding high pressure, high temperature and which can handle large volumes of condensate for its size. The spherical segment-shaped upper and lower end walls 16 and 29 of the unit facilitate an even distribution of the pressure over the ends so as to prevent deformation thereof, which would cause misalignment of the inlet and outlet couplings.

It is preferred to make the trap entirely of stainless steel because of the high corrosion resistance, ease of processing and high strength of the material. Austenitic stainless steels having a composition of:

| | |
|---|---|
| C | up to 0.08% (maximum), preferably less than 0.03% |
| Mn | up to 2.0 % (maximum) |
| Si | up to 1.0 % (maximum) |
| Cr | 16 – 22 % |
| Ni | 8 – 12 % |
| P | up to 0.045% (maximum) |
| S | up to 0.030% (maximum) |
| Fe | balance | are preferred. An especially advantageous austentinic stainless steel is AISI No. 304L, having a composition of:

| | |
|---|---|
| C | up to 0.03% (maximum) |
| Mc | up to 2.0 % (maximum) |
| Si | up to 1.0 % (maximum) |
| Gr | 18 – 20 % |
| Ni | 8 – 12 % |
| P | up to 0.045% (maximum) |
| S | up to 0.030% (maximum) |

It has been found that this latter material is especially resistant to corrosion under the service conditions of steam traps.

The various parts of the trap can be fabricated by conventional techniques, such as drawing and machining, in accordance with known procedures.

The entire steam trap, after it is assembled, as aforesaid, is treated to remove residual stresses therein. In one satisfactory procedure the assembled steam trap is annealed in a vacuum at 1950° F. The unit is then cooled in an inert gas atmosphere and is particularly quickly cooled through its critical zone to end up with a finished steam trap that is free from stresses. The inert gas atmosphere utilized in the cooling process is for the purpose of maintaining the stainless steel exterior of the product bright and shiny.

Although the preferred embodiment of the invention illustrated in the drawings employs flanges 18 and 33 on the mating ends of the sections 11 and 12, the invention also contemplates a modification in which such flanges are not provided and the casing sections 11 and 12 are secured together by butt welding. In another modification, the adjacent end portions of the casing sections 11 and 12 are sized so as to snugly slideably interfit and they are secured together by an overlap weld.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an inverted bucket steam trap, comprising a casing having side, top and bottom walls defining a watertight generally cylindrical chamber, a vertically movable inverted bucket substantially coaxially disposed in said chamber and having a cylindrical vertical wall which is open at its bottom and which has a wall at its top, a substantially coaxial inlet for steam and condensate in the bottom wall of said casing and communicating with the interior of said bucket, an outlet in the top wall of said casing, said outlet being laterally offset from the longitudinal axis of said chamber and having a valve seat thereon, a valve member movably disposed in said chamber and adapted to be moved into and out of sealing engagement with said valve seat, and operating lever means disposed in said chamber and extending laterally from around the center of the top wall of said bucket to a position below said valve seat and having said valve member coupled thereto so that the raising and lowering of said bucket in said chamber moves said valve member toward and away from said valve seat, the improvement which comprises:

said casing consists of first and second casing sections, each of said casing sections being made of a single metal sheet and having the shape of a cylindrical cup of uniform thin wall thickness, the first casing section being open at its top and closed at its bottom by a downwardly bowed spherical-segment-shaped bottom wall and having a coaxial central first opening extending through the vertex of said bottom wall, the second casing section being open at its bottom and closed at its top by an upwardly bowed spherical-segment-shaped top wall whose vertex is coaxial with the vertex of said bottom wall, said top wall having a second opening extending therethrough at a location laterally offset from the vertex of said top wall, the bottom end of said second casing section being welded to the top end of said first casing section to define said chamber; a separately formed tubular inlet fitting extending through said first opening into the lower end of said chamber to provide said inlet for steam and condensate; a separately formed tubular outlet fitting extending through said second opening into the upper end of said chamber to provide said outlet and said valve seat.

2. An inverted bucket steam trap according to claim 1, wherein said top wall of said inverted bucket is located vertically above the plane of juncture of said casing sections.

3. An inverted bucket steam trap according to claim 1, wherein both of said first and second casing sections are annealed drawn stainless steel sheets.

4. An inverted bucket steam trap according to claim 1, wherein the open ends of both of said first and second casing sections are flared radially outwardly to defining opposing flanges; and weld means joining said flanges.

5. An inverted bucket steam trap according to claim 1, wherein said first casing section is a stainless steel sheet drawn to form a first cylindrical sidewall which is open at its top and closed at its bottom by said spherical segment-shaped bottom wall, wherein said second casing section is a stainless steel sheet drawn to form a second cylindrical sidewall which is equal in diameter to the diameter of said first cylindrical sidewall and which is open at its bottom and closed at its top by said spherical segment-shaped top wall, wherein said drawn stainless steel sheets are annealed, and including a stainless steel weld joining said first and second casing sections.

6. An inverted bucket steam trap according to claim 5, in which said sheets consist of AISI No. 304L stainless steel.

7. An inverted bucket steam trap according to claim 5 wherein said inlet fitting and said outlet fitting are made of annealed stainless steel.

8. An inverted bucket steam trap according to claim 7 wherein said operating lever means is supported on said outlet fitting.

* * * * *